March 21, 1933.  J. D. R. DE LAND  1,902,119
ORCHARD PROTECTIVE SYSTEM
Filed Jan. 16, 1932   2 Sheets-Sheet 2
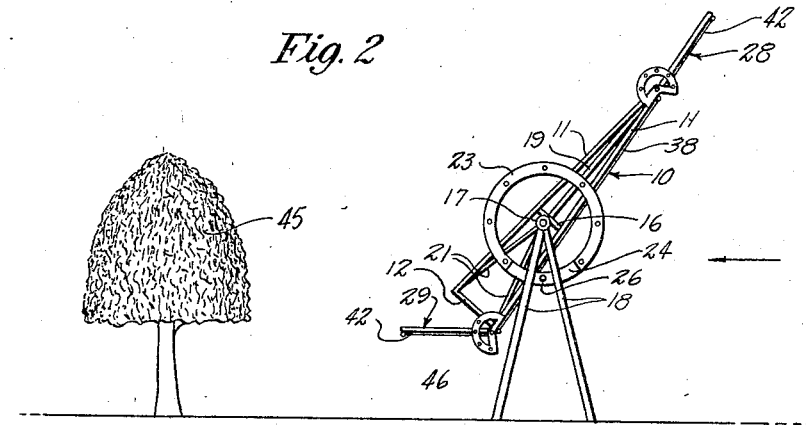
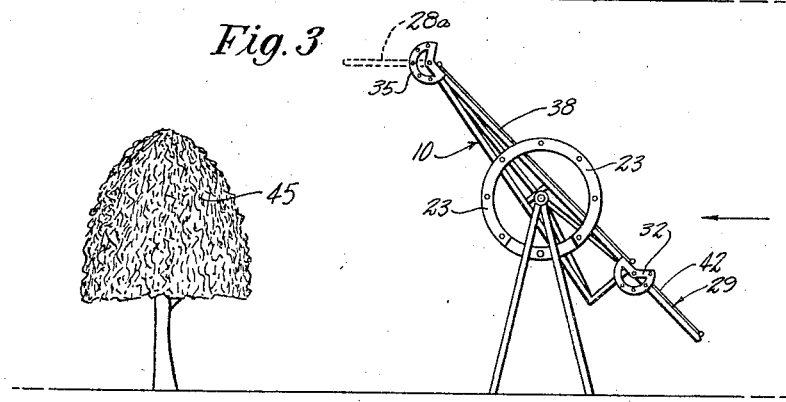
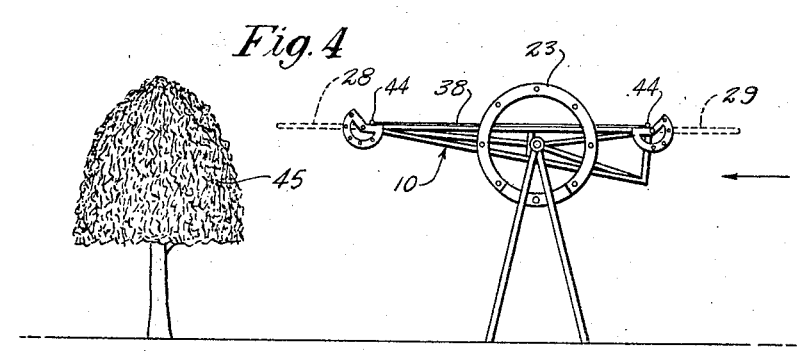
Inventor
John Del Rea DeLand.
Attorney.

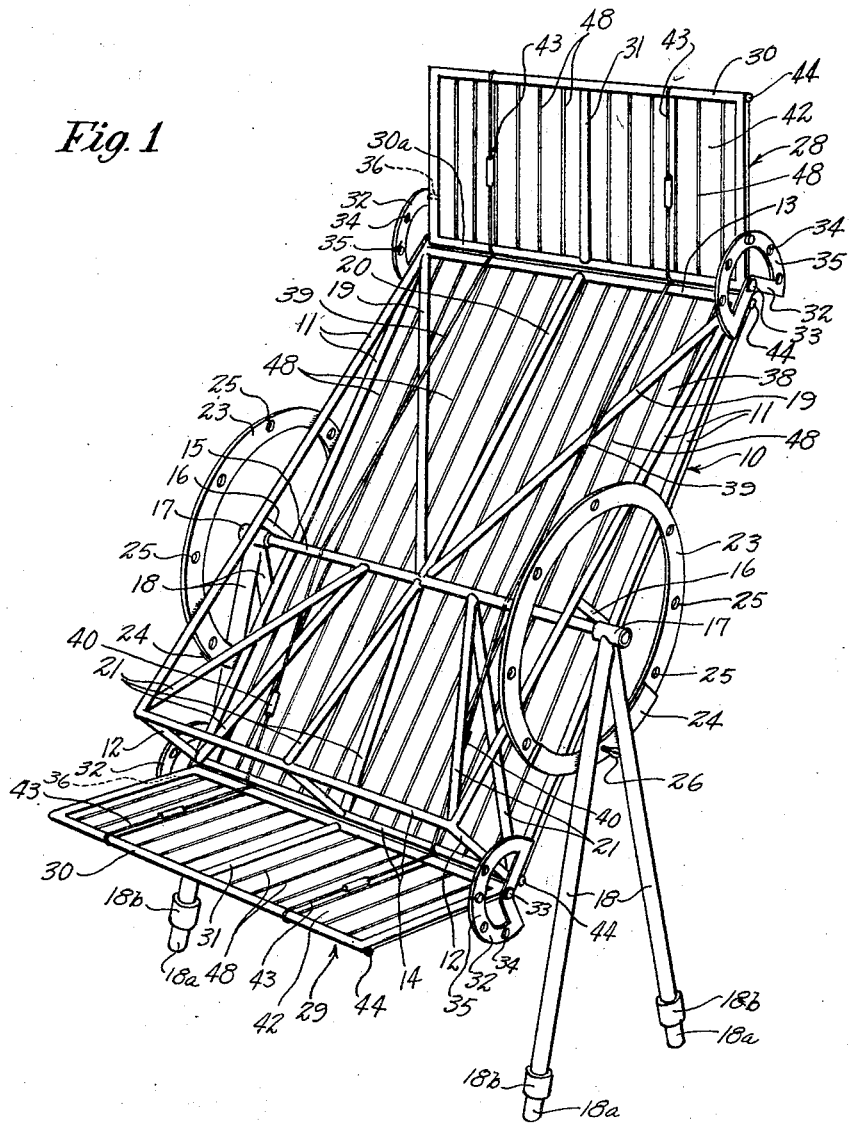

Patented Mar. 21, 1933

1,902,119

UNITED STATES PATENT OFFICE

JOHN DEL REA DE LAND, OF PICO, CALIFORNIA

ORCHARD PROTECTIVE SYSTEM

Application filed January 16, 1932. Serial No. 587,055.

This invention has reference to wind directing baffle walls adapted to be positioned along the windward sides of orchards to protect them from the destructive action of hot winds, or to prevent frosting of the trees by causing air circulation to be set up in the orchard. The nature of the present invention, both with respect to its objects and the type of structure employed, is similar in certain respects to the invention comprising the subject matter of Patent No. 1,749,068, granted to me March 4, 1930, on orchard protective system.

The objects of the invention are three-fold. First, the present type of baffle system is designed with the view of preventing the deleterious effect had upon orchard trees and the fruit, by hot winds such as commonly prevail in fruit districts in Southern California, these hot winds to which I refer being commonly termed "Santa Anas". My observations have been that in blowing through an orchard, these hot winds produce a skin friction on the trees and fruit that develops an electric charge which has the effect of burning the leaves and fruit on the trees. This is evidenced by the fact that after an orchard has been subjected to these hot winds for some time, the leaves and fruit present a burnt appearance. That the burning of the fruit in this manner results not merely from temperature conditions alone, but rather from the effect of the velocity of hot winds passing through the orchard, is indicated by the fact that by directing the hot winds away from the trees, the burning effect usually encountered is obviated. In accordance with the invention, I have provided a baffle wall structure whereby such burning winds may be deflected upwardly into the atmosphere above the orchard trees, and to such an extent that the wind velocity through the orchard is reduced to the point at which no appreciable amount of burning of the trees takes place.

A second object of the invention is to provide a baffle wall system adaptable not only for preventing the destructive effect had on the orchard trees by hot winds, but which is also capable of preventing damage to the trees as a result of frost during the cold season. I have ascertained that in the atmosphere above the normal height of the trees, there is at almost all times a substantial wind velocity, and that this condition prevails at such times as the trees ordinarily are subjected to frost, when there is little or no wind velocity close to the ground or up to a height corresponding to that of orchard trees. The prevention of damage to the trees by frost is accomplished in accordance with the invention by adapting the same baffle wall that is utilized, as hereinabove described, to direct the hot and comparatively low wind currents above the orchard, for causing the wind currents in the zone above the tops of the orchard trees, to be directed through the orchard close to the ground surface. It is commonly known that in order for frost conditions to prevail, the atmosphere must be relatively quiet with little or no wind velocity. Therefore by setting up a current of air by directing the wind currents from the super atmospheric region downwardly through the orchard, I am enabled to set up sufficient wind velocity through the trees to prevent frosting.

A third object of the invention is to provide a baffle wall structure capable of being adjusted to a position such that when not in use for either of the purposes above mentioned, has no wind obstructing or deflecting effect, so that when the prevailing conditions are such that it is desired to maintain the normal wind velocity through the orchard, the baffle wall may be rendered ineffective without having to disassemble or take down the wall.

Various additional objects of the invention, as well as the details of a typical form of baffle structure representing a preferred form of the invention, will be understood from a description to follow. Reference is had for purposes of description to the accompanying drawings in which:

Fig. 1 is a perspective view showing one section or unit of a continuous baffle wall structure adapted to be arranged along the windward side of the orchard;

Fig. 2 is a side elevation of the baffle unit shown in Fig. 1, Fig. 2 illustrating the arrangement of the baffle wall relative to the orchard trees and also one position of the baffle wall;

Fig. 3 is a view similar to Fig. 1 but showing the baffle wall to be adjusted to a position of reverse inclination; and Fig. 4 is similar to Figs. 2 and 3, but shows the baffle wall to be adjusted to its inoperative or non-wind obstructing position.

In Fig. 1, I show one section or unit of an entire baffle wall structure that in practice would be erected along the windward side of the orchard. It will be clear without further illustration, that the entire baffle wall will consist of a series of units, as illustrated in Fig. 1, arranged end to end so as to form a substantially continuous wall. Each unit may be described generally as comprising a wall having a substantially continuous, as distinguished from apertured, wind deflecting surface extending upwardly to a point preferably above the orchard trees. Suitable mounting means, which may be of any desired construction, is provided for enabling the wall to be adjusted to a position of inclination such as indicated in Fig. 2, or to a position of reverse inclination, as shown in Fig. 3, or to the horizontal position of Fig. 4.

In Fig. 1, the frame of the baffle wall is indicated generally by the numeral 10, and while this frame may be of any suitable construction, I have shown it typically as comprising triangularly arranged end members 11 coming together at their upper ends, and connected at their lower ends by members 12. The two sets of end frame members 11 are connected at their upper ends by member 13, and at their lower ends by members 14. A transverse shaft 15, the ends of which project beyond the ends of a baffle wall, is attached, by welding or otherwise, to braces 16 extending between the frame members 11, and the shaft is journaled at its ends in bearings 17 carried on the upper ends of standards 18. These standards are connected to footing posts 18a, embedded in the ground, by coupling unions 18b. The latter serve also as means for adjusting the heights of the respective standards.

The wall structure is reenforced by a system of braces consisting of rods 19 and 20, welded at their upper ends to cross member 13 and converging to points of attachment with shaft 15 at its longitudinal center, and rods 21 having their lower ends welded to members 14 and their upper ends welded to the shaft. As will readily appear, the entire wall structure is rotatable in bearings 17 to any of the positions shown in Figs. 2, 3 or 4.

As a means for holding the wall in any position of adjustment to which it may be turned, I provide a pair of circular bands 23 which are welded to the outsides of frame members 11 at each end of the wall, bands 23 being concentric with shaft 15. A pair of circular segments 24, registering with bands 23, are attached to standards 18. The circular bands 23 have a series of apertures 25 spaced at suitable intervals, which are adapted to register with openings in segments 24, and the wall is retained in any one position of adjustment by inserting pins 26 through the openings in segments 24 and the openings in the bands registering therewith.

A pair of vanes 28 and 29 is attached to the upper and lower ends of the wall, these vanes being pivotally connected with the wall in such manner as to be adjustable to various positions of angularity relative thereto. Each of the vanes comprises a rectangular frame 30 having a cross brace 31, the sides of the frame corresponding with that of the wall proper. The vanes are pivotally mounted on the wall by means of brackets 32 welded to frame members 11, and having openings through which removable pins 33 are inserted within openings (not shown) in the inner transverse frame members 30a of the vanes. As will appear, the vanes are pivotally adjustable about pins 33, and the vanes may be held in the desired positions of adjustment by pins inserted through openings 34 within circular segments 35 of the brackets, the pins so inserted being adapted to project into openings 36 in the end frame members of the vanes.

Any suitable form of covering may be provided for the wall and its attached vanes, but I preferably utilize a fabric or canvas covering so attached to the frames as to be readily removable. The frame 10 carries on its back surface, as viewed in Fig. 1, a canvas covering 38 which is held in place and drawn taut by a plurality of cables 39 extending longitudinally of the wall and around the end frame members thereof. Cables 39 may be taken up and the covering distended over the frame by turn buckles 40 carried by the cables. The vanes 28 and 29 have similar fabric coverings 42 held in place by cables 43 extending around the upper and lower members of the vane frames. The fabric covering on both the large frame 11 and the vane frames may be maintained properly distended laterally of the frames by securing the fabric to transversely extending rods 44 to which the cables 39 and 43 are fastened. The canvas coverings on both the frame 11 and the vane frames, are supported by a plurality of wires 48 attached to the upper and lower transverse members of the frames. These longitudinally extending wires 48 support the canvas in the sense that as wind pressure is exerted against the outer surface of the coverings, the coverings are backed up by the wires.

Fig. 2 represents the position to which the baffle wall assembly may be adjusted during such times as there would normally be but little or no wind velocity through the orchard, represented by trees 45, under which conditions frost would be likely to occur in the orchard due to the absence of air currents. In this position of the wall, the upper vane 28 preferably is adjusted to the position shown, in which the vane in effect forms a continuation of the wall proper. Here the wall will extend to a height such that the wind currents which normally prevail in the atmosphere above the trees, will be deflected downwardly by the baffle wall, and then horizontally toward the orchard trees through space 46 between the lower edge of the wall and the ground. In this position of the wall, the lower vane 29 is adjusted to a substantially horizontal position as shown, in order to form with the ground surface, an air shaft or tunnel which materially aids in the setting up of an air flow toward the orchard trees. Thus by the arrangement of Fig. 2, the air currents flowing with substantial velocity in the higher atmospheric zone, will be caused to pass downwardly along the outside of the baffle wall, and thence to blow horizontally through the orchard and through the normally quiet stratum of air occupied by the trees.

In the event hot winds are blowing toward the orchard, that in the absence of some deflecting means would tend to produce a burning effect on the trees as hereinabove mentioned, the baffle wall may be swung toward the left from the position of Fig. 2, to that of Fig. 3. Here the lower vane 29 is adjusted to the position shown, in whcih it forms a downward continuation of the wall proper. In this position of the wall, the upper vane 28 may be removed, if desired, or it may be adjusted either to the dotted line position 28a or it may be allowed to remain in the position of Fig. 2. Thus in Fig. 3, the hot wind currents, upon striking the baffle wall, are deflected upwardly into the atmosphere above the orchard trees, to the end that the wind velocity through the orchard is so reduced as to produce no deleterious effect upon the trees.

Under normal temperature conditions and when the air is comparatively quiet, it may be desirable to permit as much wind flow through the orchard as possible, and to render the baffle wall inoperative as an obstruction to wind flow. Under such conditions, the wall may be adjusted to the horizontal position of Fig. 4, wherein substantially no resistance is offered by the baffle wall to the passage of air currents through the orchard. When the wall is adjusted to its horizontal position, the vanes 28 and 29 either may be adjusted to horizontal positions as shown, or they may be detached from the wall and set aside.

I claim:

1. An orchard protective wind deflecting structure adapted to be erected at the windward side of an orchard comprising, a baffle wall having a substantially continuous wind deflecting surface extending upwardly above the orchard trees, means pivotally supporting said wall intermediate its upper and lower ends, and a vane attached to said wall and movable relative thereto.

2. An orchard protective wind deflecting structure adapted to be erected at the windward side of an orchard comprising, a baffle wall having a substantially continuous wind deflecting surface extending upwardly above the orchard trees, a vane pivotally attached to said wall, and means for holding said vane in adjusted positions relative to said wall.

3. An orchard protective wind deflecting structure adapted to be erected at the windward side of an orchard comprising, a baffle wall having a substantially continuous wind deflecting surface extending upwardly above the orchard trees, a pair of vanes pivotally attached to the upper and lower ends of said wall, and means for holding said vanes in adjusted positions relative to said wall.

4. An orchard protective wind deflecting structure adapted to be erected at the windward side of an orchard comprising, a baffle wall having a substantially continuous wind deflecting surface extending upwardly above to orchard trees, and a vane attached to said wall and extending at an angle relative thereto.

5. An orchard protective wind deflecting structure adapted to be erected at the windward side of an orchard comprising, a baffle wall having a substantially continuous wind deflecting surface extending upwardly above the orchard trees, and inclined toward the orchard, and a horizontally extending vane attached to the lower end of said wall.

6. An orchard protective wind deflecting structure adapted to be erected at the windward side of an orchard comprising, a baffle wall having a substantially continuous wind deflecting surface extending upwardly above the orchard trees, a pair of vanes pivotally attached to the upper and lower ends of said wall, said wall and vanes being made up of frames having fabric covers, and means for holding said vanes in adjusted position relative to said wall.

7. An orchard protective wind deflecting structure adapted to be erected at the windward side of an orchard comprising, a baffle wall having a substantially continuous wind deflecting surface extending upwardly above the orchard trees, means for pivotally supporting said wall at its sides, means associated with said supporting means for holding said wall in a plurality of positions of adjustment, a pair of vanes pivotally attached to the upper and lower ends of said wall, and means for holding said vanes in adjusted positions relative to said wall.

8. An orchard protective wind deflecting structure adapted to be erected at the windward side of an orchard comprising, a baffle wall having a substantially continuous wind deflecting surface extending upwardly above the orchard trees, said wall including a frame and a cover placed over said frame, means pivotally supporting said frame intermediate its upper and lower ends, the wall being movable to adjusted positions of inclination and to a substantially horizontal position about said supporting means, and the wall in horizontal position being spaced from the orchard trees.

9. An orchard protective wind deflecting structure adapted to be erected at the windward side of an orchard comprising, a baffle wall having a substantially continuous wind deflecting surface extending upwardly above the orchard trees, said wall including a metallic frame and a fabric cover placed over said frame, means pivotally supporting said frame intermediate its upper and lower ends, the wall being movable to adjusted positions of inclination and to a substantially horizontal position about said supporting means, and the wall in horizontal position being spaced from the orchard trees.

10. An orchard protective wind deflecting structure adapted to be erected at the windward side of an orchard comprising, a baffle wall having a substantially continuous wind deflecting surface extending upwardly above the orchard trees, a vane attached to said wall and extending at an angle relative thereto, and means pivotally supporting said wall intermediate its upper and lower ends and permitting movement of the wall to adjusted positions of inclination.

In witness that I claim the foregoing I have hereunto subscribed my name this 29th day of September 1931.

JOHN DEL REA DE LAND.